United States Patent [19]

Takaoka

[11] Patent Number: 4,975,783
[45] Date of Patent: Dec. 4, 1990

[54] FACSIMILE MACHINE HAVING ERROR CORRECTION MODE

[75] Inventor: Tatsuo Takaoka, Isehara, Japan

[73] Assignee: Ricoh Company, Ltd., Tokyo, Japan

[21] Appl. No.: 373,274

[22] Filed: Jun. 28, 1989

[30] Foreign Application Priority Data

Jul. 6, 1988 [JP] Japan .................... 63-166875

[51] Int. Cl.⁵ .................................... H04M 1/00
[52] U.S. Cl. ........................... 358/404; 358/406; 358/437; 358/444; 358/463
[58] Field of Search ............... 358/404, 406, 437, 444, 358/463

[56] References Cited

U.S. PATENT DOCUMENTS

| | | | |
|---|---|---|---|
| 4,494,149 | 1/1988 | Furukawa | 358/404 |
| 4,878,123 | 10/1989 | Miura | 358/404 |

FOREIGN PATENT DOCUMENTS

| | | | |
|---|---|---|---|
| 0915281 | 3/1982 | Greece | 358/404 |
| 112370 | 6/1985 | Japan | 358/404 |
| 60-183874 | 9/1985 | Japan | 358/404 |

Primary Examiner—Edward L. Coles, Sr.
Attorney, Agent, or Firm—Oblon, Spivak, McClelland, Maier & Neustadt

[57] ABSTRACT

A facsimile machine has an error correction mode in conformance with the CCITT recommendations. An image information read out from a first memory is recorded on a recording device when it is in a recordable state and is temporarily stored in a second memory when the recording device is in a non-recordable state and the second memory has an empty region. A reception process is discontinued when the recording device is in the non-recordable state or when no empty region is available in the second memory, and a message indicating that an image information is stored in the first memory is displayed when the reception process is discontinued. The image information read out from the first memory is recorded on the recording device when it resumes the recordable state after the reception process is discontinued.

15 Claims, 7 Drawing Sheets

FIG.5

| No. | TYPE | PAGE NO. | RESULT | DESTINATION |
|---|---|---|---|---|
| 5 | SUBSTITUTE RECEPTION | 5 | E | XXXXXX XXXXXX |
| | E C M | 1 | E | |

POWER SUPPLY CUTOFF REPORT

'88.XX.XX   XX:XX         '88.XX.XX

THESE FILES WERE ERASED DUE TO POWER SUPPLY CUTOFF

FIG.6

```
       b ---- '88.XX.XX     d
a ---- POWER SUPPLY CUTOFF REPORT                    i ---- DESTINATION
                                                            XXXXXX
c ---- '88.XX.XX    XX:XX                            h ---- RESULT
       THESE FILES WERE ERASED DUE TO POWER SUPPLY CUTOFF   E
                                                     g ---- PAGE NO.
                                                            5
                                                     f ---- TYPE
                                                            SUBSTITUTE
                                                            RECEPTION
e ---- No.
       5
```

FACSIMILE MACHINE HAVING ERROR CORRECTION MODE

BACKGROUND OF THE INVENTION

The present invention generally relates to facsimile machines, and more particularly to a facsimile machine having an error correction mode (ECM) in conformance with the CCITT recommendations.

The ECM is a mode in which an image information is transmitted in blocks which are constituted by a plurality of data frames in conformance with a high level data link control (HDLC) procedure, and when a receiving side facsimile machine (hereinafter simply referred to as a destination) detects a transmission error a transmitting side facsimile machine (hereinafter simply referred to as a source) retransmits a data frame in which the error is detected. An error correction code is transmitted with the image information in frames, and the transmission error is detected be using the error correction code.

For this reason, in order to enable retransmission of the requested data frame from the source, it is necessary for the source to temporarily store one block of image information which is transmitted. In addition, when one received block of image information contains an error, the destination must receive the retransmitted frame data which corresponds to the frame data in which the error was detected. Hence, the destination must also temporarily store the received image information so that one block of image data may be constituted using the retransmitted frame data which contains no error.

Accordingly, the facsimile machine having the ECM is provided with an ECM buffer memory for temporarily storing one block of image information. For example, the ECM buffer memory has a memory capacity of 64 kbits which is normally sufficient to store an image information amounting to one page of document.

When the facsimile machine having the ECM is receiving a transmission, a plotter may break down, a paper jam may occur in the plotter and the plotter may run out of recording paper during a recording of an image. When this non-recordable state of the plotter occurs in a facsimile machine which is not provided with a so-called store and forward (SAF) image memory, the reception process of the destination is discontinued by transmitting to the source a disconnect (DCN) signal or a procedural interrupt negative (PIN) signal each of which is a line disconnect instruction. On the other hand, in the case of the facsimile machine provided with the so-called SAF image memory, the received image information is stored in the SAF image memory but the DCN signal or the like is transmitted to discontinue the reception process when the memory capacity of the SAF image memory becomes insufficient to store all the image information.

In the above described case, one block of the received image information is temporarily stored in the ECM buffer memory. However, when the reception process is discontinued, the content of the ECM buffer memory is erased at the same time. For this reason, there is a problem in that the received image information amounting to one page of document is erased without ever being recorded on the plotter.

Generally, the image memory for storing the image information is of a type which erases (or clears) the content thereof when the supply of power is cut off. Thus, when the image information which is not yet recorded is stored in the ECM buffer memory but the power supply to the facsimile machine is cut off due to a power failure or the like, the image information stored in the ECM buffer memory is erased.

Conventionally, when the power supply is cut off, the facsimile machine records and outputs after the supply of power is resumed a report indicating that the power supply was cut off, so that the operator is informed of the erasure of the received image information stored in the SAF image memory. But conventionally, there is a problem in that the operator is not informed of the erasure of the image information stored in the ECM buffer memory due to the cutoff of the power supply, and the operator has no means of knowing this erasure. of the image information stored in the ECM buffer memory.

SUMMARY OF THE INVENTION

Accordingly, it is a general object of the present invention to provide a novel and useful facsimile machine in which the problems described above are eliminated.

Another and more specific object of the present invention is to provide a facsimile machine having an error correction mode in conformance with CCITT recommendations comprising modem means coupled to a transmission path for modulating an image information which is transmitted to the transmission path and for demodulating an image information which is received from the transmission path, where the image information is transmitted and received in blocks respectively having a predetermined format and including a predetermined number of frames of image information with error correction codes for use in detecting an error in the image information, communication control means coupled to the modem means for controlling communications to and from the transmission path, scanning means for scanning a document image which is to be transmitted and for outputting the image information of the scanned document image as a transmitting image information, recording means for recording an image described by a received image information onto a recording sheet, first memory means for temporarily storing the transmitting image information and the received image information in blocks, second memory means, display means for displaying a message, and system control means for controlling operations of the communication control means, the scanning means, the recording means and the display means. The system control means includes means for supplying the image information read out from the first memory means to the recording means when the recording means is in a recordable state and for temporarily storing the image information read out from the first memory means in the second memory means when the recording means is in a non-recordable state and the second memory means has an empty region, discontinuing means for discontinuing a reception process by disconnecting from the transmission path when the recording means is in the non-recordable state or when no empty region is available in the second memory means, means for displaying on the display means a message indicating that an image information is stored in the first memory means when the reception process is discontinued, and means for supplying the image information read out from the first memory means to the recording means to record an image when the recording means resumes the recordable state after the reception process is discontinued.

According to the facsimile machine of the present invention, when the reception process is discontinued, the operator is informed that the first memory means stores an image information. Hence, it is possible to prevent the operator from cutting off the power supply when removing the cause of the discontinuance of the reception process, so that the image information stored in the first memory means is recorded on the recording sheet when the above cause is removed. In other words, it is possible to always record the image information which is temporarily stored.

Still another object of the present invention is to provide a facsimile machine having an error correction mode in conformance with CCITT recommendations comprising modem means coupled to a transmission path for modulating an image information which is transmitted to the transmission path and for demodulating an image information which is received from the transmission path, where the image information is transmitted and received in blocks respectively having a predetermined format and including a predetermined number of frames of image information with error correction codes for use in detecting an error in the image information, communication control means coupled to the modem means for controlling communications to and from the transmission path, scanning means for scanning a document image which is to be transmitted and for outputting the image information of the scanned document image as a transmitting image information, recording means for recording an image described by a received image information onto a recording sheet, memory means for temporarily storing the transmitting image information and the received image information in blocks, display means for displaying a message, and system control means for controlling operations of the communication control means, the scanning means, the recording means and the display means. The system control means includes means for discriminating whether or not an image information is stored in the memory means when a supply of power to the facsimile machine is cut off and thereafter resumed, and means for supplying to the recording means a report indicating that a power supply cutoff occurred. According to the facsimile machine of the present invention, it is possible to inform the operator of an erased image information when the image information is erased due to a power supply cutoff.

Other objects and further features of the present invention will be apparent from the following detailed description when read in conjunction with the accompanying drawings.

BRIEF DESCRIPTION OF THE DRAWINGS

FIG. 5 shows an essential part of a first embodiment of a power supply cutoff report which is outputted;

FIG. 6 shows an essential part of a second embodiment of the power supply cutoff report which is outputted.

DESCRIPTION OF THE PREFERRED EMBODIMENTS

Figure 1:
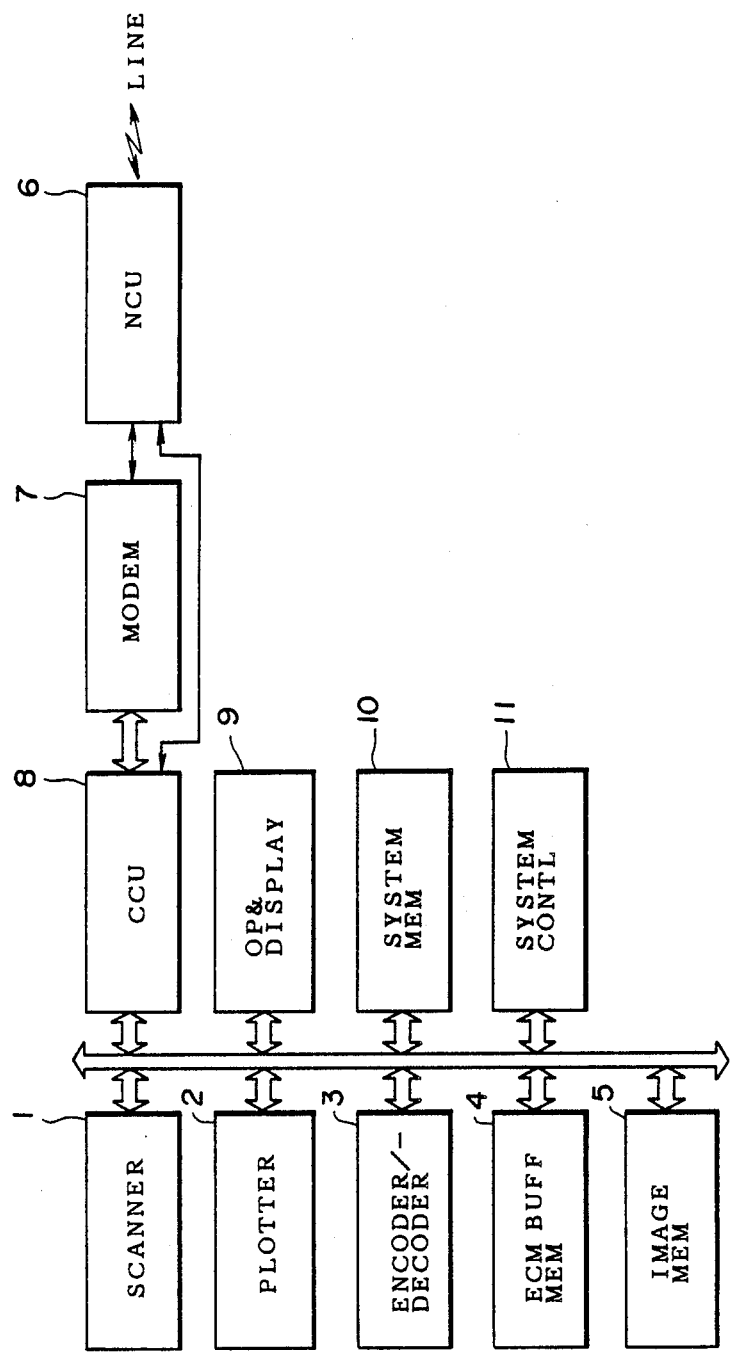
FIG. 1 is a system block diagram showing an embodiment of a facsimile machine according to the present invention.

FIG. 1 shows an embodiment of a facsimile machine according to the present invention. The facsimile machine generally comprises a scanner 1, a plotter 2, an encoder/decoder 3, an ECM buffer memory 4, an image memory 5, a network control unit 6, a modem 7, a communication control unit 8, an operation and display device 9, a system memory 10, and a system controller 11.

The scanner 1 reads a document image and outputs an image information having a predetermined resolution. The plotter 2 records an image information on a recording sheet (paper). The plotter 2 is provided with known devices for detecting non-recordable states thereof such as when the plotter 2 runs out of the recording sheet, a paper jam occurs in the plotter 2 and when the plotter 2 breaks down. The encoder/decoder 3 encodes an image information which is to be transmitted to a destination facsimile machine and decodes an image information which is received from a source facsimile machine.

The ECM buffer memory 4 temporarily stores one block of image information which is transmitted and received when making a communication in the ECM. The image memory 5 is the so-called SAF image memory and stores an image information when making a transmission of memorized information or when making a reception of memorized information.

The network control unit 6 carries out predetermined call out and call accept operations by making a line connection, sending a destination telephone number as a selection signal and detecting a call in.

The modem 7 modulates the image information which is transmitted to the destination and demodulates the image information which is received from the source. The modem 7 also transmits various procedure signals of the transmission control procedure. The communication control unit 8 controls the network control unit 6 and the modem 7 and carries out a facsimile transmission according to a predetermined transmission control procedure.

The operation and display device 9 includes a display for displaying states (or modes) of the facsimile machine and a manipulation part having keys for instructing predetermined transmission and reception processes to the facsimile machine.

The system memory 10 stores various information required for the transmission and reception processes. A portion of the system memory 10 is constituted by a static random access memory (RAM) which is backed up by a battery. Various communication information such as the destination telephone number, the communication mode, the line density of the received image, an information of receive terminal identification (hereinafter simply referred to as an RTI information), the compression mode, the size of the received image, and the communication result of the facsimile communication being made is stored in a memory region of the static RAM. This memory region also stores management information on image information files which are stored in the ECM buffer memory 4 and the image memory 5.

The system controller 11 is constituted by a microcomputer. The system controller 11 controls various parts of the facsimile machine to carry out a predetermined operation on the facsimile machine.

Figure 2:
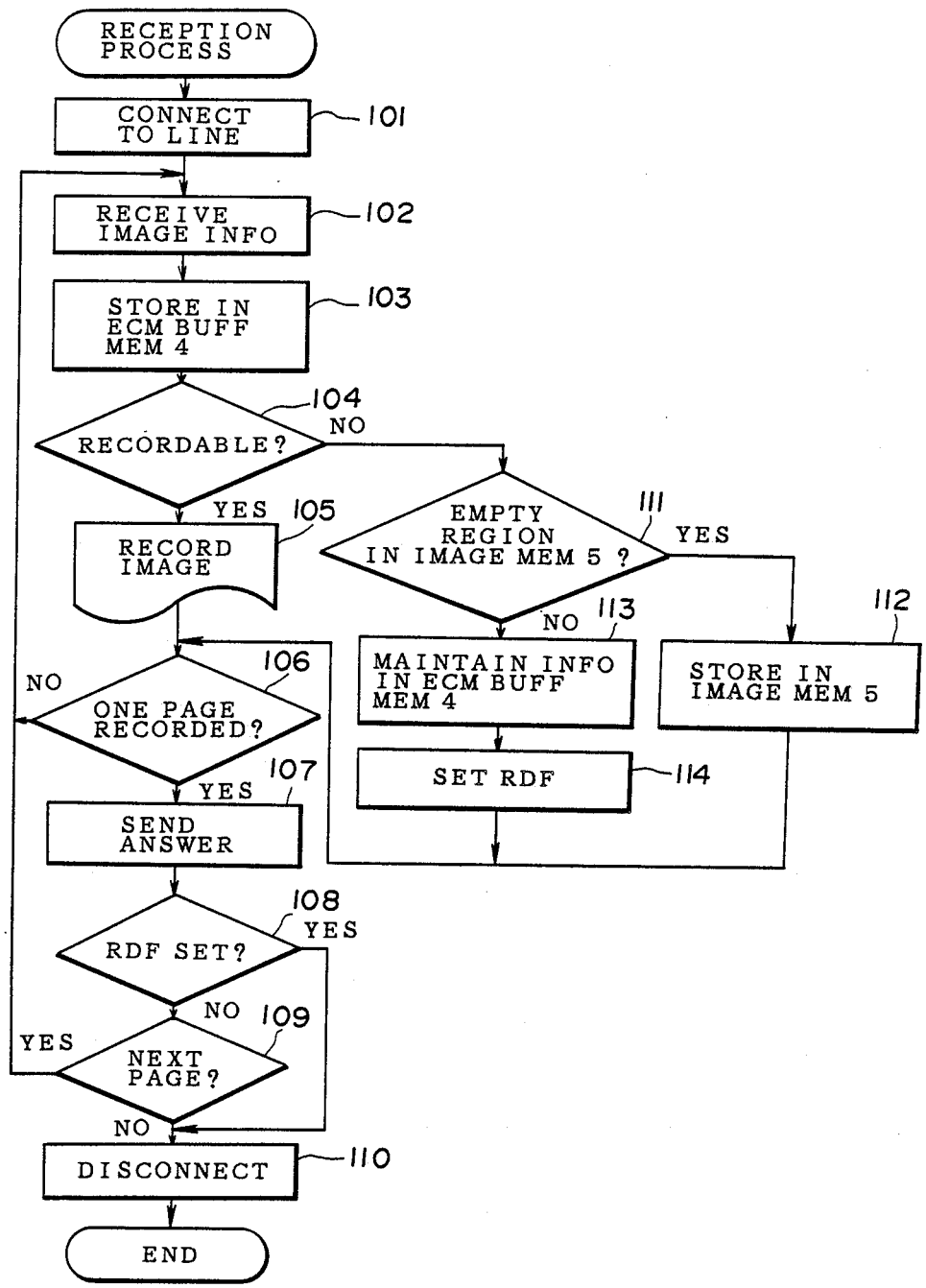
FIG. 2 is a flow chart for explaining a reception process of the embodiment.

FIG. 2 shows a reception process carried out by the system controller 11 of the facsimile machine shown in FIG. 1 in the ECM.

In FIG. 2, a step 101 connects the facsimile machine to a line when a call in is detected. This step 101 includes a process of discriminating the communication mode by carrying out a predetermined transmission control procedure. In this embodiment, the communication mode is detected as being the ECM, and a step 102 successively receives the image information. Then, a step 103 decodes the received image information and temporarily stores the decoded image information in the ECM buffer memory 4.

Next, a step 104 discriminates whether or not the plotter 2 is in a recordable state. When the discrimination result in the step 104 is YES, a step 105 successively reads the image information from the ECM buffer memory 4 one line at a time and transfers the read image information to the plotter 2 so as to record the received image one line at a time. A step 106 discriminates whether or not the recording of one page is ended. The process returns to the step 102 when the discrimination result in the step 106 is NO.

On the other hand, when the discrimination result in the step 106 becomes YES, a step 107 sends a procedure signal indicative of the reception result as an answer. For example, when a transmission error is detected in the received image information by use of an error correction code which is received therewith, a partial page request (PPR) signal is sent to make a retransmission request. In addition, when discontinuing the reception process such as when it is impossible to continue receiving the image information, a DCN signal or a PIN signal is sent to end the reception process. For the sake of convenience, it will be assumed that the image information is correctly received and a message confirmation (MCF) signal is sent.

In this embodiment, when it is impossible to continue receiving the image information, the step 107 sets a reception discontinuance flag RDF.

A step 108 discriminates whether or not the reception discontinuance flag RDF is set. When the discrimination result in the step 108 is NO, a step 109 discriminates whether or not a next page will be transmitted. When the discrimination result in the step 109 is YES, the process returns to the step 102 so as to similarly carry out the reception process with respect to the image information related to the next page.

When the discrimination result in the step 109 is NO, a step 110 disconnects the line by carrying out a predetermined transmission control procedure. Hence, the reception process is ended and the facsimile machine enters a waiting state.

On the other hand, the plotter 2 may run out of the recording sheet, a paper jam may occur in the plotter 2, and the plotter 2 may break down during the reception of the image information. When the plotter 2 is in the non-recordable state and the discrimination result in the step 104 is NO, a step 111 discriminates whether or not an empty region exists in the image memory 5. When the discrimination result in the step 111 is YES, a step 112 stores the image information within the ECM buffer memory 4 into the empty region of the image memory 5 instead of transferring the image information to the plotter 2. Thereafter, the reception process is carried out similarly to the above by advancing to the step 106.

The image memory 5 stores the image information of the document image which is to be transmitted as an image information file also when making a transmission of memorized information. For this reason, the image memory 5 may not have an empty region for storing the received image information.

When the image memory 5 does not have an empty region and the discrimination result in the step 111 is NO, a step 113 maintains the image information stored in the image memory 5 as an image information file so as not to erase this image information, and also maintains the image information stored in the ECM buffer memory 4 as it is. But because it is impossible to continue receiving the image information in this case, a step 114 sets the reception discontinuance flag RDF. The reception discontinuance flag RDF and the management information on the image information files maintained in the ECM buffer memory 4 and the image memory 5 are stored in a memory region of the static RAM which is within the system memory 10 and is backed up by the battery.

When the reception discontinuance flag RDF is set and the reception of one page of image information is ended in the step 106, the step 107 sends a PIN signal, for example, so as to discontinue the reception process. In this case, the discrimination result in the step 108 is YES, and the process advances to the step 110 to immediately disconnect the line and enter the waiting state.

As described before, various communication information such as the destination telephone number, the communication mode, the line density of the received image, the RTI information, the compression mode, the size of the received image, and the communication result of the facsimile communication being made is stored in the memory region of the static RAM of the system memory 11. When the reception process is correctly ended without being discontinued, the various communication information stored in the static RAM is erased.

Figure 3:
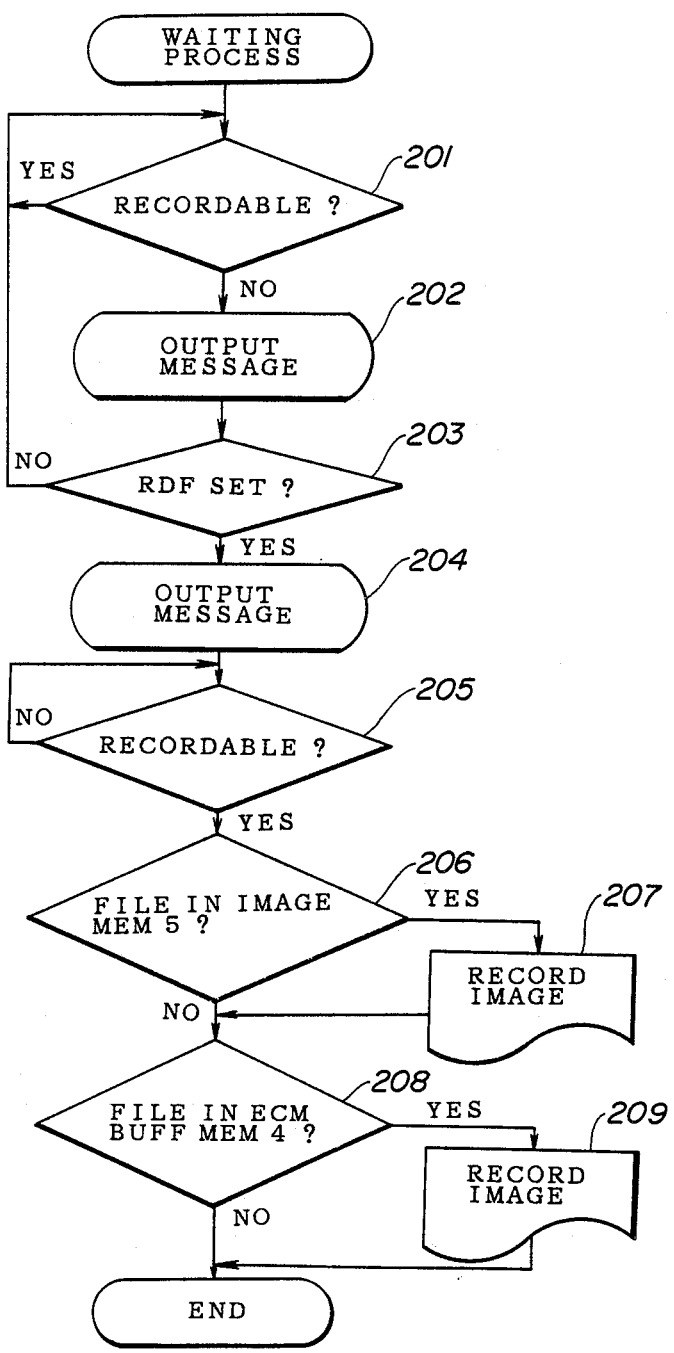
FIG. 3 is a flow chart for explaining a waiting process of the embodiment.

FIG. 3 shows a process carried out by the system controller 11 of the facsimile machine shown in FIG. 1 in the waiting state thereof. In FIG. 3, a step 201 discriminates whether or not the plotter 2 is in the recordable state. When the discrimination result in the step 201 is NO, a step 202 displays a message (or warning) on the operation and display device 9 by detecting the cause of the non-recordable state of the plotter 2. For example, when the plotter 2 is in the non-recordable state due to a paper jam, the message displayed on the operation and display device 9 may state "PAPER JAM—PLEASE REMOVE RECORDING SHEET".

Next, a step 203 discriminates whether or not the reception discontinuance flag RDF is set. The process returns to the step 201 when the discrimination result in the step 203 is NO.

On the other hand, when the discrimination result in the step 203 is YES, a step 204 displays a message on the operation and display device 9 to indicate that there is an image information stored in the ECM buffer memory 4. For example, this message may state "ECM FILE EXISTS". Thereafter, a step 205 discriminates whether or not the plotter 2 is in the recordable state.

The operator attends to the maintenance of the plotter 2 by reading the message displayed on the operation and display device 9. In other words, the operator removes the paper jam or supplies the recording sheets, for example, depending on the message displayed on the operation and display device 9.

When the plotter 2 resumes the recordable state by the maintenance, the discrimination result in the step 205 becomes YES. A step 206 discriminates whether or not the image information stored in the image memory 5 by the step 112 shown in FIG. 2 exists, that is, whether or not a received image information file exists. When the discrimination result in the step 206 is YES, a step 207 successively reads out the stored image information from the image memory 5 and records the image information on the plotter 2.

After the step 207 or when the discrimination result in the step 206 is NO, a step 208 discriminates whether or not the image information maintained within the ECM buffer memory 4 by the step 113 shown in FIG. 2 exists, that is, whether or not a received image information file exists. When the discrimination result in the step 208 is YES, a step 209 successively reads out the stored image information from the ECM buffer memory 4 and records the image information on the plotter 2. On the other hand, the process is ended after the step 209 or when the discrimination result in the step 208 is NO.

Figure 4:
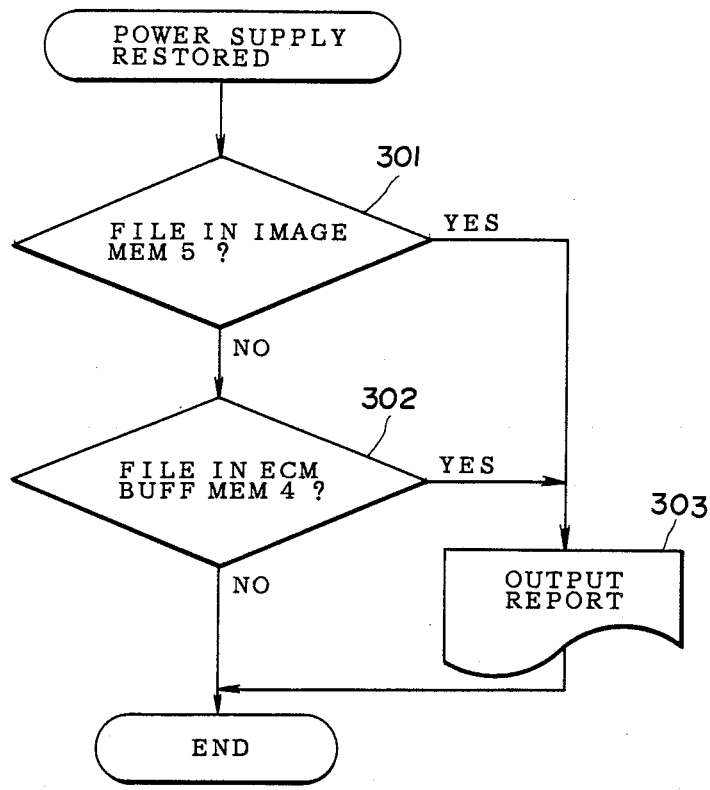
FIG. 4 is a flow chart for explaining a process of the embodiment when a supply of power is resumed.

When the supply of power to the facsimile machine is once cut off, the image information files stored in the ECM buffer memory 4 and the image memory 5 are erased. FIG. 4 shows a process carried out by the system controller 11 of the facsimile machine shown in FIG. 1 when the power supply is once cut off and thereafter resumed.

In FIG. 4, when the power supply to the facsimile machine is resumed, a step 301 discriminates whether or not an image information file was stored in the image memory 5 when the power supply was cut off, based on the file management information stored in the memory region of the static RAM within the system memory 10. When the discrimination result in the step 301 is NO, a step 302 discriminates whether or not an image information file was stored in the ECM buffer memory 4.

When the discrimination result in the step 301 or 302 is YES, a step 303 records on the plotter 2 an information related to the stored image information file so as to output a power supply cutoff report. The process is ended after the step 303 or when the discrimination result in the step 302 is NO.

FIG. 5 shows a embodiment of the power supply cutoff report which is output from the facsimile machine. In FIG. 5, a indicates a title of the report, b indicates an output date, c indicates a date and time when the power supply cutoff occurred, and d indicates a message indicating that a power supply cutoff has occurred. In addition, e indicates a file number of the image information file stored in the image memory 5, and f indicates a type of the image information, where "SUBSTITUTE RECEPTION" indicates a received image information file within the image memory 5 and "ECM" indicates an image information file within the ECM buffer memory 4. Furthermore, g indicates a page number of the image, h indicates a result of the reception process, where "E" indicates that an error has occurred due to the power supply cutoff, and i indicates a destination telephone number.

Therefore, according to this embodiment, when the plotter 2 becomes non-recordable during the image information reception process, a substitute reception is made by storing the received image information in the image memory 5 but the reception process is discontinued when there is no more empty region within the image memory 5. In this case, the image information stored in the ECM buffer memory 4 is not erased but maintained, and a message is displayed to indicate that the ECM buffer memory 4 contains the image information. On the other hand, when the plotter 2 becomes recordable after displaying the message, the image information is read out from the ECM buffer memory 4 and recorded on the plotter 2.

When the power supply to the facsimile machine is cut off, the image information in the ECM buffer memory 4 will be erased. Hence, when the operation and display device 9 displays the message indicating that the ECM buffer memory 4 contains the image information, the operator can make sure not to cut off the power supply when attending to the maintenance of the plotter 2. Accordingly, it is possible to always record the received image information which is stored in the ECM buffer memory 4.

When the power supply to the facsimile machine is cut off and thereafter resumed, the power supply cutoff report which is output makes an indication when there exists an image information file within the ECM buffer memory 4 and/or the image memory 5 which is erased. As a result, the operator is informed of the erased image information.

Conventionally, there is a power supply cutoff report which indicates only the content of the image information file within the image memory 5. But in this embodiment, it is possible to also indicate the content of the image information file within the ECM buffer memory 4 with ease.

Figure 7:
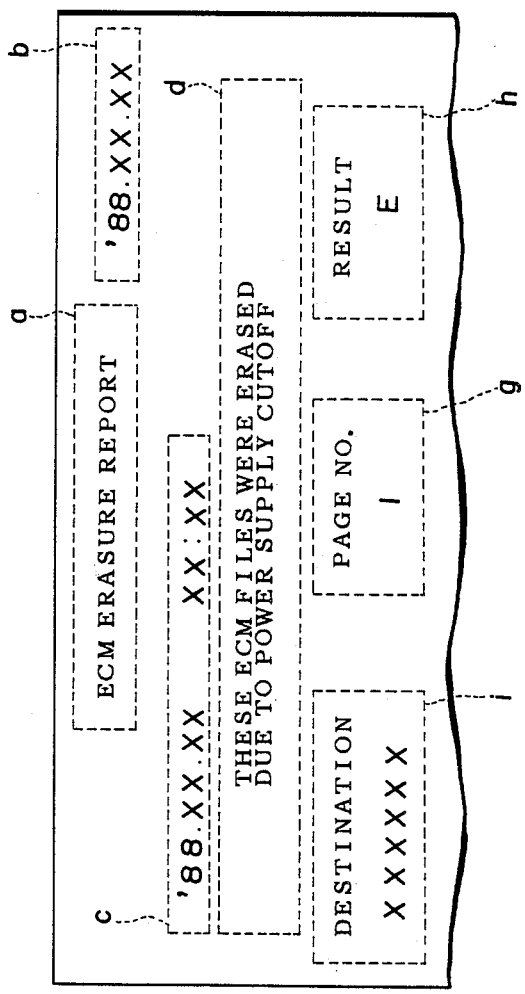
FIG. 7 shows an essential part of an ECM erasure report which is outputted.

In the above described embodiment, the image information files within the ECM buffer memory 4 and the image memory 5 are indicated on a single power supply cutoff report. However, it is possible to independently output the content of the image memory 5 as a power supply cutoff report shown in FIG. 6 and the content of the ECM buffer memory 4 as an ECM erasure report shown in FIG. 7. By independently outputting the power supply cutoff report and the ECM erasure report, it is possible to output only one of the reports which is required. Further, the content of the report can be readily understood by the operator by merely looking at the title a.

The embodiment described heretofore is applied to the facsimile machine which is provided with the SAF image memory (image memory 5). But in the case of a facsimile machine which is not provided with the SAF image memory, the step 113 shown in FIG. 2 is carried out immediately when the discrimination result in the step 104 becomes NO. In addition, the processes related to the image memory 5, that is, the steps 206 and 207 shown in FIG. 3 and the step 301 shown in FIG. 4 are omitted. As a result, it becomes possible to always record the content of the ECM buffer memory 4 similarly as in the case of the described embodiment.

Furthermore, according to the process shown in FIG. 3, the content of the image memory 5 is recorded when the plotter 2 becomes recordable. However, it is of course not essential to record the content of the image memory 5 when the plotter 2 becomes recordable. Moreover, by outputting the power supply cutoff report or the like when the power supply is resumed even when no image information file to be output exists, it becomes possible to inform the operator of the time when the power supply was cut off.

The steps 202 and 204 shown in FIG. 3 need not display the message in characters, and the message may be displayed by a lamp such as a light emitting diode (LED) and/or a sound or voice.

The memory capacity of the ECM buffer memory 4 is 64 kbits in the described embodiment. But the memory capacity of the ECM buffer memory 4 may be set arbitrarily. For example, the memory capacity of the ECM buffer memory 4 may be set to 128 kbits which corresponds to two pages of document image.

Further, the present invention is not limited to these embodiments, but various variations and modifications may be made without departing from the scope of the present invention.

What is claimed is:

1. A facsimile machine having an error correction mode in conformance with CCITT recommendations comprising:

modem means coupled to a transmission path for modulating an image information which is transmitted to the transmission path and for demodulating an image information which is received from the transmission path, said image information being transmitted and received in blocks respectively having a predetermined format and including a predetermined number of frames of image information with error correction codes for use in detecting an error in the image information;

communication control means coupled to said modem means for controlling communications to and from the transmission path;

scanning means for scanning a document image which is to be transmitted and for outputting the image information of the scanned document image as a transmitting image information;

recording means for recording an image described by a received image information onto a recording sheet;

first memory means for temporarily storing the transmitting image information and the received image information in blocks;

second memory means;

display means for displaying a message; and system control means for controlling operations of said communication control means, said scanning means, said recording means and said display means, said system control means including means for supplying the image information read out from said first memory means to said recording means when said recording means is in a recordable state and for temporarily storing the image information read out from said first memory means in said second memory means when said recording means is in a non-recordable state and said second memory means has an empty region, discontinuing means for discontinuing a reception process by disconnecting from the transmission path when said recording means is in the non-recordable state or when no empty region is available in said second memory means, means for displaying on said display means a message indicating that an image information is stored in said first memory means when said reception process is discontinued, and means for supplying the image information read out from said first memory means to said recording means to record an image when said recording means resumes the recordable state after said reception process is discontinued.

2. The facsimile machine as claimed in claim 1 wherein said system control means further includes means for maintaining the image information stored in said first memory means when said reception process is discontinued.

3. The facsimile machine as claimed in claim 1 wherein said system control means further includes means for displaying on said display means a message indicating that said recording means is in the non-recordable state when said reception process is discontinued.

4. The facsimile machine as claimed in claim 1 wherein said system control means further includes means for discriminating whether or not an image information is stored in said first memory means when said reception process is discontinued, and means for supplying to said recording means the image information read out from said first memory means when it is discriminated that the image information is stored in said first memory means.

5. The facsimile machine as claimed in claim 1 wherein said system control means further includes means for discriminating whether or not an image information is stored in said second memory means when said reception process is discontinued, and means for supplying to said recording means the image information read out from said second memory means when it is discriminated that the image information is stored in said second memory means.

6. The facsimile machine as claimed in claim 1 wherein said system control means further includes means for discriminating whether or not an image information is stored in said second memory means when a supply of power to said facsimile machine is cut off and thereafter resumed, and means for supplying to said recording means a report indicating that a power supply cutoff occurred.

7. The facsimile machine as claimed in claim 6 wherein said system control means further includes means for discriminating whether or not an image information is stored in said first memory means when a supply of power to said facsimile machine is cut off and thereafter resumed.

8. The facsimile machine as claimed in claim 7 wherein said report also indicates an information on the image information which is erased from said first memory means and/or said second memory means by the power supply cutoff.

9. The facsimile machine as claimed in claim 8 wherein said information on the image information is selected from a group at least including a title of the report, date and time when the power supply cutoff occurred, a file number of the erased image information, a type of file of the erased image information, and a telephone number of a destination facsimile machine.

10. The facsimile machine as claimed in claim 7 wherein said report also indicates an information on the image information which is erased from said second memory mean by the power supply cutoff.

11. The facsimile machine as claimed in claim 10 wherein said system control means further includes means for supplying to said recording means another report indicating that the image information stored in said first memory means is erased.

12. The facsimile machine as claimed in claim 11 wherein said other report includes an information on the image information which is erased from said first memory means which is selected from a group at least including a title of the report and a telephone number of a destination facsimile machine.

13. A facsimile machine having an error correction mode in conformance with CCITT recommendations comprising:

modem means coupled to a transmission path for modulating an image information which is transmitted to the transmission path and for demodulating an image information which is received from the transmission path, said image information being transmitted and received in blocks respectively having a predetermined format and including a predetermined number of frames of image information with error correction codes for use in detecting an error in the image information;

communication control means coupled to said modem means for controlling communications to and from the transmission path;

scanning means for scanning a document image which is to be transmitted and for outputting the image information of the scanned document image as a transmitting image information;

recording means for recording an image described by a received image information onto a recording sheet;

memory means for temporarily storing the transmitting image information and the received image information in blocks;

display means for displaying a message; and system control means for controlling operations of said communication control means, said scanning means, said recording means and said display means, said system control means including means for discriminating whether or not an image information is stored in said memory means when a supply of power to said facsimile machine is cut off and thereafter resumed, and means for supplying to said recording means a report indicating that a power supply cutoff occurred.

14. The facsimile machine as claimed in claim 13 wherein said report also indicates an information on the image information which is erased from said memory means by the power supply cutoff.

15. The facsimile machine as claimed in claim 14 wherein said information on the image information is selected from a group at least including a title of the report, date and time when the power supply cutoff occurred, a file number of the erased image information, a type of file of the erased image information, and a telephone number of a destination facsimile machine.

* * * * *